(12) United States Patent
Wang

(10) Patent No.: US 11,638,037 B2
(45) Date of Patent: Apr. 25, 2023

(54) OPERATING POINT ENTITY GROUP SIGNALING IN CODED VIDEO

(71) Applicant: Lemon Inc., Grand Cayman (KY)

(72) Inventor: Ye-Kui Wang, San Diego, CA (US)

(73) Assignee: LEMON INC., Grand Cayman (KY)

( * ) Notice: Subject to any disclaimer, the term of this patent is extended or adjusted under 35 U.S.C. 154(b) by 32 days.

(21) Appl. No.: 17/473,554

(22) Filed: Sep. 13, 2021

(65) Prior Publication Data

US 2022/0086496 A1 Mar. 17, 2022

Related U.S. Application Data

(60) Provisional application No. 63/088,786, filed on Oct. 7, 2020, provisional application No. 63/079,946, filed on Sep. 17, 2020.

(51) Int. Cl.
*H04N 19/70* (2014.01)
*H04N 19/172* (2014.01)
*H04N 19/30* (2014.01)
*H04N 19/169* (2014.01)

(52) U.S. Cl.
CPC ........... *H04N 19/70* (2014.11); *H04N 19/172* (2014.11); *H04N 19/188* (2014.11); *H04N 19/30* (2014.11)

(58) Field of Classification Search
CPC .... H04N 19/70; H04N 19/172; H04N 19/188; H04N 19/30
See application file for complete search history.

(56) References Cited

U.S. PATENT DOCUMENTS

| 2015/0110473 | A1 | 4/2015 | Wang et al. |
| 2016/0234144 | A1* | 8/2016 | Hannuksela ........... H04N 19/00 |
| 2017/0111650 | A1 | 4/2017 | Hendry et al. |
| 2022/0086494 | A1 | 3/2022 | Wang |
| 2022/0086495 | A1 | 3/2022 | Wang |

FOREIGN PATENT DOCUMENTS

| JP | 2017516338 A | 6/2017 |
| JP | 2018524877 A | 8/2018 |
| JP | 2018530967 A | 10/2018 |

(Continued)

OTHER PUBLICATIONS

Examination Report from Indian Patent Application No. 202124042121 date May 24, 2022 (6 pages).

(Continued)

*Primary Examiner* — Jae N Noh
(74) *Attorney, Agent, or Firm* — Perkins Coie LLP

(57) ABSTRACT

Systems, methods and apparatus for generating or parsing a visual media file according to a file format include performing a conversion between a visual media data and a visual media file that stores a bitstream of the visual media data according to a format rule. The visual media file stores multiple tracks that belong to an entity group of a specific type. The format rule specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type.

20 Claims, 11 Drawing Sheets performing a conversion between a visual media data and a visual media file that stores a bitstream of the visual media data according to a format rule that specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type

(56) References Cited

FOREIGN PATENT DOCUMENTS

| JP | 2019511173 | A | | 4/2019 | | |
|---|---|---|---|---|---|---|
| JP | 2020080547 | A | | 5/2020 | | |
| JP | 2020515169 | A | | 5/2020 | | |
| WO | 2020012073 | A1 | | 1/2020 | | |
| WO | WO-2020012073 | A1 | * | 1/2020 | ........... | H04N 21/816 |
| WO | 2020058894 | A1 | | 3/2020 | | |
| WO | 2020109154 | A1 | | 6/2020 | | |
| WO | 2020156549 | A1 | | 8/2020 | | |
| WO | 2022060113 | A1 | | 3/2022 | | |
| WO | WO-2022060113 | A1 | * | 3/2022 | | |

OTHER PUBLICATIONS

Examination Report from Indian Patent Application No. 202124042107 dated May 4, 2022 (5 pages).
Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.
Bross et al. ""Versatile Video Coding (Draft 10),"" Joint Video Experts Team (JVET)of ITU-T SG 16 WP 3 and ISO/IEC JTC 1/SC 29/WG 1119th Meeting: by teleconference, Jun. 22-Jul. 1, 2020, document JVET-S2001, 2020.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
"Information Technology—Coding of Audio-Visual Objects—Part 15: Carriage of Network Abstraction Layer (NAL) Unit Structured Video in the ISO Base Media File Format" ISO/IEC 14496-15:2019(E), ISO/IEC JTC 1/SC 29/WG 11, Jan. 13, 2014.
"Information Technology—Coding of Audio-Visual Objects—Part 15: Carriage of Network Abstraction Layer (NAL) Unit Structured Video in the ISO Base Media File Format—Amendment 2: Carriage of VVC and EVC in ISOBMFF" Motion Picture Expert Group or ISO/IEC JTC 1/SC 29/WG 11, ISO/IEC 14496-15:2019(E) Amendment 2, ISO/IEC JTC 1/SC 29/WG 11, Jan. 13, 2014.
"Information Technolog —Coded Representation of Immersive Media—Part 3: Versatile Video Coding" ISO/IEC JTC 1/SC 29 /WG 11 N 18692, Text of ISO/IEC CD 23090-3, ISO/IEC JTC 1/SC 29/WG 11, Jul. 12, 2019.
Sanchez et al. "Multilayer VVC in File Format," ISO/IEC JTC 1/SC 29/WG 11, MPEG 2020, document m54446, Jun. 2020.
"Text of ISO/IEC 14496-15:2019 DAM 2 Carriage of VVC and EVC in ISOBMFF," N19454, Jul. 29, 2020, Convenor, ISO/IEC JTC 1/SC 29/WG 11.
"Text of ISO/IEC 23008-12:2017 CDAM 3 Support for VVC, EVC, Slideshows and other Improvements" N19460, Jul. 24, 2020, Convenor, ISO/IEC JTC 1/SC 29/WG 11.
"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.
"WD of Carriage of VVC in ISOBMFF" Motion Picture Expert Group or ISO/IEC JTC 1/SC 29/WG 11Coding of moving pictures and audio, N18856, Oct. 11, 2019.
Extended European Search Report from European Application No. 21197196.5 dated Nov. 17, 2021.
Extended European Search Report from European Application No. 21197219.5 dated Nov. 17, 2021.
Extended European Search Report from European Application No. 21197225.2 dated Nov. 17, 2021.
Non Final Office Action from U.S. Appl. No. 17/473,425 dated Sep. 1, 2022.

* cited by examiner

OPERATING POINT ENTITY GROUP SIGNALING IN CODED VIDEO

CROSS REFERENCE TO RELATED APPLICATIONS

Under the applicable patent law and/or rules pursuant to the Paris Convention, this application is made to timely claims the priority to and benefits of U.S. Provisional Patent Application No. 63/079,946, filed on Sep. 17, 2020, and U.S. Provisional Patent Application No. 63/088,786, filed on Oct. 7, 2020. For all purposes under the law, the entire disclosures of the aforementioned applications are incorporated by reference as part of the disclosure of this application.

TECHNICAL FIELD

This patent document relates to generation, storage and consumption of digital audio video media information in a file format.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by visual media processing apparatus for writing to or parsing from a visual media file according to a file format.

In one example aspect, a visual media processing method is disclosed. The method includes performing a conversion between a visual media data and a visual media file that stores a bitstream of the visual media data in multiple tracks according to a format rule that specifies that the file-level information includes a syntax element that identifies one or more tracks from the multiple tracks that contain a specific type of sample group that includes operation point information.

In another example aspect, a visual media processing method is disclosed. The method includes performing a conversion between a visual media data and a visual media file that stores a bitstream of the visual media data according to a format rule. The visual media file stores one or more tracks comprising one or more video layers. The format rule specifies that whether a first set of syntax elements indicative of layer dependency information is stored in the visual media file is dependent on whether a second syntax element indicating that all layers in the visual media file are independent has a value 1.

In another example aspect, a visual media processing method is disclosed. The method includes performing a conversion between a visual media data and a visual media file storing a bitstream of the visual media data in multiple tracks according to a format rule that specifies a manner in which redundant access unit delimiter network access layer (AUD NAL) units stored in the multiple tracks are processed during an implicit reconstruction of the bitstream from the multiple tracks.

In another example aspect, a visual media processing method is disclosed. The method includes performing a conversion between a visual media data and a visual media file that stores a bitstream of the visual media data according to a format rule. The visual media file stores one or more tracks comprising one or more video layers. The visual media file includes information of an operation point (OP). The format rule specifies that responsive to, whether or how a syntax element is included in a sample group entry and a group box of the OP is responsive to the OP containing a single video layer. The syntax element is configured to indicate an index to an output layer set for the OP.

In another example aspect, a visual media processing method is disclosed. The method includes performing a conversion between a visual media data and a visual media file that stores a bitstream of the visual media data according to a format rule; wherein the visual media file stores multiple tracks that belong to an entity group of a specific type, and wherein the format rule specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type.

In another example aspect, a visual media processing method is disclosed. The method includes performing a conversion between a visual media data and a visual media file that stores a bitstream of the visual media data. The visual media file comprises multiple tracks and the visual media file stores an entity group that carries information regarding operation points in the visual media file and tracks carrying each operation point. A format rule specifies a property of the visual media file responsive to the visual media file storing the entity group or a sample group carrying information of each operation point.

In yet another example aspect, a visual media writing apparatus is disclosed. The apparatus comprises a processor configured to implement above-described methods.

In yet another example aspect, a visual media parsing apparatus is disclosed. The apparatus comprises a processor configured to implement above-described methods.

In yet another example aspect, a computer readable medium having code stored thereon is disclosed. The code embodies one of the methods described herein in the form of processor-executable code.

In yet another example aspect, a computer readable medium having a visual media file stored thereon is disclosed. The visual media is generated or parsed using a method described in the present document.

These, and other, features are described throughout the present document.

DETAILED DESCRIPTION

Figure 1:
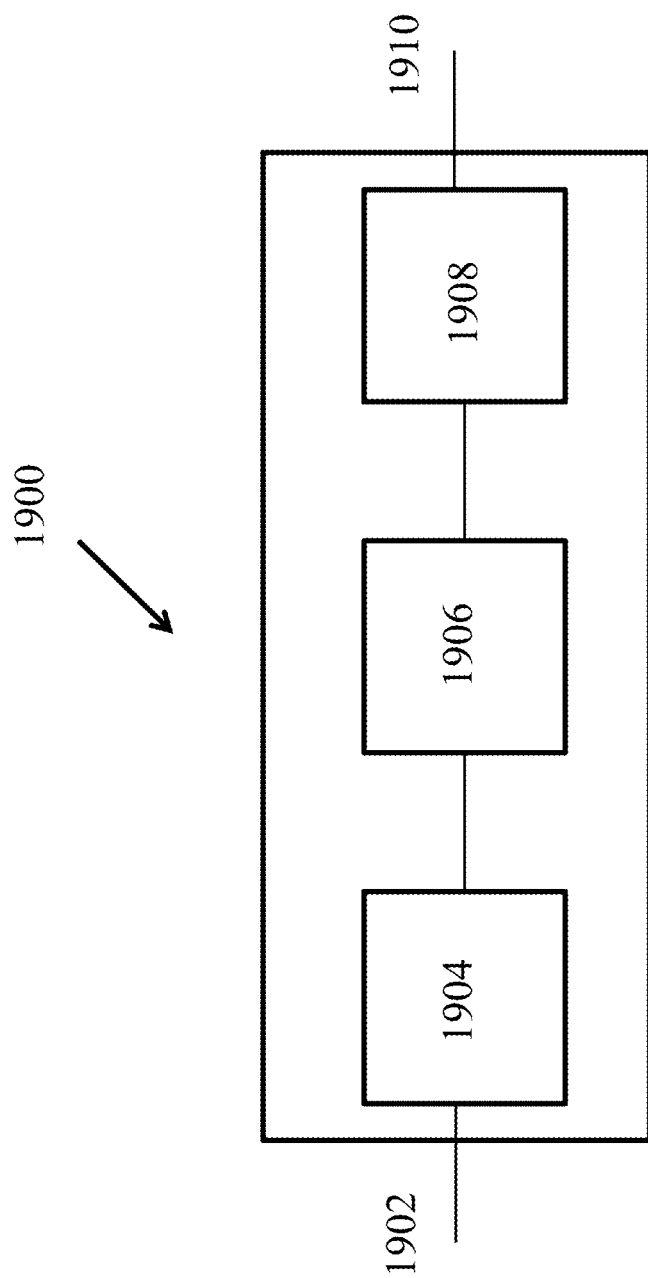
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification or ISOBMFF file format specification.

1. Initial Discussion

This document is related to video file format. Specifically, it is related to storage of scalable Versatile Video Coding (VVC) video bitstreams in media files based on the ISO base media file format (ISOBMFF). The ideas may be applied individually or in various combination, for video bitstreams coded by any codec, e.g., the VVC standard, and for any video file format, e.g., the VVC video file format being developed.

2. Abbreviations

ACT adaptive colour transform
ALF adaptive loop filter
AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CPB coded picture buffer
CRA clean random access
CRC cyclic redundancy check
CTB coding tree block
CTU coding tree unit
CU coding unit
CVS coded video sequence
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/AEC 23090-3)

3. Video Coding Introduction 3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/

HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (WC) project officially started. WC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. File Format Standards

Media streaming applications are typically based on the IP, TCP, and HTTP transport methods, and typically rely on a file format such as the ISO base media file format (ISOBMFF) [[7]]. One such streaming system is dynamic adaptive streaming over HTTP (DASH). For using a video format with ISOBMFF and DASH, a file format specification specific to the video format, such as the AVC file format and the HEVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format in would be needed.

The VVC video file format, the file format for storage of VVC video content based on ISOBMFF, is currently being developed by MPEG. The latest draft specification is MPEG output document N19454, "Information technology—Coding of audio-visual objects—Part 15: Carriage of network abstraction layer (NAL) unit structured video in the ISO base media file format—Amendment 2: Carriage of VVC and EVC in ISOBMFF", July 2020.

The VVC image file format, the file format for storage of image content coded using VVC, based on ISOBMFF, is currently being developed by MPEG. The latest draft specification of the WC image file format is included in MPEG output document N19460, "Information technology—High efficiency coding and media delivery in heterogeneous environments—Part 12: Image File Format—Amendment 3: Support for VVC, EVC, slideshows and other improvements", July 2020.

3.3. Temporal Scalability Support in VVC

VVC includes a similar support of temporal scalability as in HEVC. Such support includes the signaling of temporal ID in the NAL unit header, the restriction that pictures of a particular temporal sublayer cannot be used for inter prediction reference by pictures of a lower temporal sublayer, the sub-bitstream extraction process, and the requirement that each sub-bitstream extraction output of an appropriate input must be a conforming bitstream. Media-aware network elements (MANEs) can utilize the temporal ID in the NAL unit header for stream adaptation purposes based on temporal scalability.

3.4. Picture Resolution Change Within a Sequence in VVC

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

In order to allow reusing the motion compensation module of existing implementations, the scaling ratio is restricted to be larger than or equal to ½ (2 times downsampling from the reference picture to the current picture), and less than or equal to 8 (8 times upsampling). The horizontal and vertical scaling ratios are derived based on picture width and height, and the left, right, top and bottom scaling offsets specified for the reference picture and the current picture.

RPR allows resolution change without the need of coding an IRAP picture, which causes a momentary bit rate spike in streaming or video conferencing scenarios, e.g., to cope with network condition changes. RPR also can be used in application scenarios wherein zooming of the entire video region or some region of interest is needed. The scaling window offsets are allowed to be negative to support a wider range of zooming-based applications. Negative scaling window offsets also enable extraction of subpicture sequences out of a multi-layer bitstream while keeping the same scaling window for the extracted sub-bitstream as in the original bitstream.

Differently from the spatial scalability in the scalable extension of HEVC, where picture resampling and motion compensation are applied in two different stages, RPR in VVC is carried out as part of the same process on a block level where the derivation of sample positions and motion vector scaling are performed during motion compensation.

In an effort to limit the implementation complexity, a change of picture resolution within a CLVS is disallowed when the pictures in the CLVS have multiple subpictures per picture. Furthermore, decoder side motion vector refinement, bi-directional optical flow, and prediction refinement with optical flow are not applied when RPR is used between the current picture and the reference pictures. The collocated picture for the derivation of temporal motion vector candidates is also restricted to have the same picture size, scaling window offsets, and CTU size as the current picture.

For support of RPR, some other aspects of the VVC design have been made different from HEVC. First, the picture resolution and the corresponding conformance and scaling windows are signaled in the PPS instead of in the SPS, while in the SPS the maximum picture resolution and corresponding conformance window are signaled. In applications, the maximum picture resolution with the corresponding conformance window offsets in the SPS can be used as intended or desired picture output size after cropping. Second, for a single-layer bitstream, each picture store (a slot in the DPB for storage of one decoded picture) occupies the buffer size as required for storing a decoded picture having the maximum picture resolution.

3.5. Multilayer Scalability Support in VVC

Having the ability to inter-predict from reference pictures of different sizes than the current picture by means of RPR in the VVC core design allows VVC to easily support bitstreams containing multiple layers of different resolutions, e.g., two layers with standard definition and high definition resolutions, respectively. In a VVC decoder, such functionality can be integrated without the need of any additional signal-processing-level coding tool, as the upsampling functionality needed for spatial scalability support can be provided by reusing the RPR upsampling filter. Nevertheless, additional high-level syntax designs to enable the scalability support of a bitstream are needed.

Scalability is supported in VVC but is included only in the multi-layer profiles. Different from the scalability supports in any earlier video coding standards, including extensions of AVC and HEVC, the design of VVC scalability has been made friendly to single-layer decoder implementations as much as possible. The decoding capability for multi-layer bitstreams are specified in a manner as if there was only a single layer in the bitstream. For example, the decoding capability, such as the DPB size, is specified in a manner that is independent of the number of layers in the bitstream to be decoded. Basically, a decoder designed for single-layer bitstreams does not need significant changes to be able to decode multi-layer bitstreams.

Compared to the designs of multi-layer extensions of AVC and HEVC, the HLS aspects have been significantly simplified at the sacrifice of some flexibility. For examples, 1) an IRAP AU is required to contain a picture for each of the layers present in the CVS, which avoids the need of specifying a layer-wise startup decoding process, and 2) a much simpler design for POC signaling, instead of the complicated POC resetting mechanism, is included in VVC, to make sure that the derived POC values are the same for all pictures in an AU.

Like in HEVC, the information about layers and layer dependency is included in the VPS. The information of OLSs is provided for signaling of which layers are included in an OLS, which layers are output, and other information such as PTL and HRD parameters associated with each OLS. Similar to HEVC, there are three modes of operations to output either all layers, only the highest layer, or particular indicated layers in a custom output mode.

There are some differences between the OLS design in VVC and in HEVC. First, in HEVC the layer sets are signaled, then OLSs are signaled based on the layer sets, and for each OLS the output layers are signaled. The design in HEVC allowed a layer to belong to an OLS that was neither an output layer nor a layer required for decoding an output layer. In VVC, the design requires any layer in an OLS to be either an output layer or a layer required for decoding an output layer. Therefore, in VVC OLSs are signaled by indicating the output layers of an OLS and then other layers belonging to an OLS are simply derived by the layer dependencies indicated in the VPS. Furthermore, VVC requires each layer to be included in at least one OLS.

Figure 8:
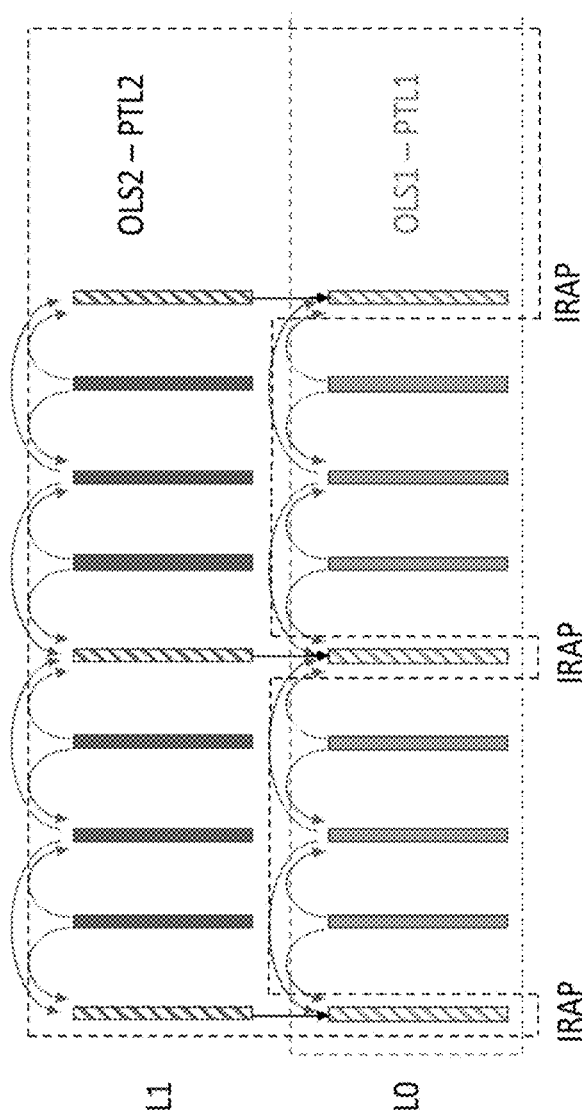
FIG. 8 shows an example of a bitstream with two OLSs where OLS2 has vps_max_tid_il_ref_pics_plus1[1][0] equal to 0.

Another difference in the VVC OLS design is that, contrary to HEVC, for which an OLS consists of all NAL units that belong to the set of identified layers mapped to the OLS, VVC may exclude some NAL units that belong to non-output layers mapped to an OLS. More specifically, an OLS for VVC consists of the set of layers that are mapped to the OLS with non-output layers including only IRAP or GDR pictures with ph_recovery_poc_cnt equal to 0 or pictures from the sublayers that are used for inter-layer prediction. This allows indicating an optimal level value for a multi-layer bitstream considering only all the "necessary" pictures of all sublayers within the layers that form the OLS, where "necessary" herein means needed for output or decoding. FIG. 8 shows an example of a two-layer bitstream with vps_max_tid_il_ref_pics_plus1[1][0] equal to 0, i.e. a sub-bitstream for which only IRAP pictures from layer L0 are kept when OLS2 is extracted.

Taking into account some scenarios for which it is beneficial to allow different RAP periodicity at different layers, similarly as in AVC and HEVC, AUs are allowed to have layers with non-aligned RAPs. For faster identification of RAPs in a multi-layer bitstream, i.e. AUs with a RAP at all layers, the access unit delimiter (AUD) was extended compared to HEVC with a flag indicating whether the AU is an IRAP AU or GDR AU. Furthermore, the AUD is mandated to be present at such IRAP or GDR AUs when the VPS indicates multiple layers. However, for single layer bitstreams as indicated by the VPS or bitstreams not referring to a VPS, the AUD is completely optional as in HEVC because in this case RAPs can be easily detected from the NAL unit type of the first slice in the AU and the respective parameter sets.

To enable sharing of SPSs, PPSs, and APSs by multiple layers and at the same time to make sure that bitstream extraction process does not throw away parameter sets needed by the decoding process, a VCL NAL unit of a first layer can refer to an SPS, PPS, or APS with the same or a lower layer ID value, as long as all OLSs that include the first layer also include the layer identified by the lower layer ID value.

3.6. Some Specifics of VVC Video File Format 3.6.1. Overview of VVC Storage With Multiple Layers The support for VVC bitstream with multiple layers includes a number of tools, and there are various 'models' of how they might be used. A VVC stream with multiple layers can be placed in tracks in several ways, among which are the following:

1. all the layers in one track, where all the layers correspond to an operating point;
2. all the layers in one track, where there is no operating point that contains all the layers;
3. one or more layers or sub-layers in individual tracks, where a bitstream containing all samples of indicated one or more tracks corresponds to an operating point;
4. one or more layers or sub-layers in individual tracks, where there is no operating point that contains all NAL units of a set of one or more tracks.

The VVC file format allows storage of one or more layers into a track. Storage of multiple layers per track can be used. For example, when a content provider wants to provide a multi-layer bitstream that is not intended for subsetting, or when the bitstream has been created for a few pre-defined sets of output layers where each layer corresponds to a view (for example stereo pair), tracks can be created accordingly.

When a VVC bitstream is represented by multiple tracks and a player uses an operating point for which the layers are stored in multiple tracks, the player must reconstruct VVC access units before passing them to the VVC decoder.

A VVC operating point may be explicitly represented by a track, i.e., each sample in the track contains an access unit natively or through resolving 'subp' track references (when present), and through resolving 'vvcN' track references (when present). The access units contain NAL units from all the layers and sub-layers that are part of the operating point.

The storage of VVC bitstreams is supported by structures such as the
 a) sample entry,
 b) Operating Points Information ('vopi') sample group,
 c) Layer Information ('linf') sample group,
 d) Operating Points Entity Group ('opeg').

The structures within a sample entry provide information for the decoding or use of the samples, in this case coded video and non-VCL data information, that are associated with that sample entry.

The Operating Points Information sample group records information about operating points such as the layers and sub-layers that constitute the operating point, dependencies (if any) between them, the profile, tier, and level parameter of the operating point, and other such operating point relevant information.

The layer information sample group lists all the layers and sub-layers carried in the samples of the track.

The Operating Points Entity Group records information about operating points such as the layers and sub-layers that constitute the operating point, dependencies (if any) between them, the profile, tier, and level parameter of the operating point, and other such operating point relevant information, as well as, identification of the tracks carrying each operating point.

The information in these sample groups, combined with using track references to find tracks, or in the operating points entity group is sufficient for a reader to choose an operating point in accordance with its capabilities, identify the tracks that contain the relevant layers and sub-layers needed to decode the chosen operating point, and efficiently extract them.

3.6.2. Data Sharing and Reconstruction VVC Bitstream 3.6.2.1. General

In order to reconstruct an access unit from samples of multiple tracks carrying a multi-layer VVC bitstream, an operating point needs to be determined first.

NOTE: When a VVC bitstream is represented by multiple VVC tracks, a file parser can identify the tracks needed for the chosen operating point as follows:
 Find all tracks with a VVC sample entry.
 If the tracks contain an 'oref' track reference to the same ID, resolve that ID to either a VVC track or an 'opeg' entity group.
 Select such an operating point from the 'opeg' entity group or 'vopi' sample group that is suitable for the decoding capacity and application purposes.
 When an 'opeg' entity group is present, it indicates that a set of tracks exactly represents the selected operating point. Thus, a VVC bitstream can be reconstructed from the set of tracks and decoded.
 When an 'opeg' entity group is not present (i.e. when a 'vopi' sample group is present), discover from the 'vopi' and 'linf' sample gropus which set of tracks is needed for decoding the selected operating point.

In order to reconstruct a bitstream from multiple VVC tracks carrying a VVC bitstream, the target highest value TemporalId may need to be determined first.

If several tracks contain data for the access unit, the alignment of respective samples in tracks is performed based on the sample decoding times, i.e. using the time-to-sample table without considering edit lists.

When a VVC bitstream is represented by multiple VVC tracks, the decoding times of the samples shall be such that if the tracks were combined into a single stream ordered by increasing decoding time, the access unit order would be correct as specified in ISO/IEC 23090-3.

A sequence of access units is reconstructed from the respective samples in the required tracks according to the implicit reconstruction process as described in 3.6.2.2.

3.6.2.2. Implicit Reconstruction of a VVC Bitstream

When the Operating Points Information sample group is present, the required tracks are selected based on the layers they carry and their reference layers as indicated by the Operating Points Information and Layer Information sample groups.

When the Operating Points Entity Group is present, the required tracks are selected based on the information in the OperatingPointGroupBox.

When reconstructing a bitstream containing a sublayer for which the VCL NAL units have TemporalId greater than 0, all lower sublayers (i.e., those for which the VCL NAL units have smaller TemporalId) within the same layer are also included in the resulting bitstream and the required tracks are selected accordingly.

When reconstructing an access unit, picture units (as specified in ISO/IEC 23090-3) from samples having the same decoding time are placed into the access unit in increasing order of the nuh_layer_id value.

When reconstructing an access unit with dependent layers and max_tid_il_ref_pics_plus1 is greater than 0, the sublayers of the reference layers for which the VCL NAL units have TemporalId less than or equal to max_tid_il_ref_pics_plus1-1 (as indicated in the operating point information sample group) within the same layer are also included in the resulting bitstream and the required tracks are selected accordingly.

When reconstructing an access unit with dependent layers and max_tid_il_ref_pics_plus1 is equal to 0, only IRAP picture units of the reference layers are included in the resulting bitstream and the required tracks are selected accordingly.

If a VVC track contains a 'subp' track reference, each picture unit is reconstructed as specified in clause 11.7.3 with the additional constraints on EOS and EOB NAL units as specified below. The process in clause 11.7.3 is repeated for each layer of the target operating point in increasing nuh_layer_id order. Otherwise, each picture unit is reconstructed as described below.

The reconstructed access units are placed into the VVC bitstream in increasing order of decoding time, and the duplicates of end of bitstream (EOB) and end of sequence (EOS) NAL units are removed from the VVC bitstream, as described further below.

For access units that are within the same coded video sequence of a VVC bitstream and that belong to different sublayers stored in multiple tracks, there may be more than one of the tracks containing an EOS NAL unit with a particular nuh_layer_id value in the respective samples. In this case, only one of the EOS NAL units shall be kept in the last of these access units (the one with the greatest decoding time) in the final reconstructed bitstream, placed after all NAL units, except the EOB NAL unit (when present), of the last of these access units, and other EOS NAL units are discarded. Similarly, there may be more than one of such tracks containing an EOB NAL unit in the respective samples. In this case, only one of the EOB NAL units shall be kept in the final reconstructed bitstream, placed at the end of the last of these access units, and other EOB NAL units are discarded.

Since a particular layer or sublayer may be represented by more than one track, when figuring out the required tracks for an operating point, a selection may need to be made among the set of tracks that all carry the particular layer or sublayer.

When the Operating Points Entity Group is not present, the final required tracks, after selection among the tracks carrying a same layer or sublayer, may still collectively carry some layers or sublayers that do not belong to the target operating point. The reconstructed bitstream for the target operating point should not contain the layers or sublayers that are carried in the final required tracks but do not belong to the target operating point.

NOTE: VVC decoder implementations take as input a bitstream corresponding to the target output layer set index and the highest TemporalId value of the target operating point, which correspond to the TargetOlsIdx and HighestTid variables in clause 8 of ISO/IEC 23090-3, respectively. A file parser needs to ensure that the reconstructed bitstream does not contain any other layers and sub-layers than those included in the target operating point before sending it to a VVC decoder.

3.6.3. Operating Points Information Sample Group 3.63.1. Definition

Applications are informed about the different operating points provided by a given VVC bitstream and their constitution by using the Operating Points Information sample group ('vopi'). Each operating point is related to an output layer set, a max TemporalId value, and a profile, level and tier signalling. All this information is captured by the 'vopi' sample group. Apart from this information, this sample group also provides the dependency information between layers.

When more than one VVC track is present for a VVC bitstream and no Operating Point entity group is present for the VVC bitstream, both of the following apply:

Among the VVC tracks for the VVC bitstream there shall be one and only one track that carries a 'vopi' sample group.

All the other VVC tracks of the VVC bitstream shall have a track reference of type 'oref' to the track that carries the 'vopi' sample group.

For any specific sample in a given track, the temporally collocated sample in another track is defined as the one with the same decoding time as that of this specific sample. For each sample $S_N$ in a track $T_N$ that has an 'oref' track reference to the track $T_k$ that carries the 'vopi' sample group, the following applies:

If there is a temporally collocated sample $S_k$ in the track $T_k$, then the sample $S_N$ is associated with the same 'vopi' sample group entry as the sample $S_k$.

Otherwise, the sample $S_N$ is associated with the same 'vopi' sample group entry as the last of the samples in the track $T_k$ that precede the sample $S_N$ in decoding time.

When several VPSs are referenced by a VVC bitstream, it may be needed to include several entries in the sample group description box with grouping_type 'vopi'. For more common cases where a single VPS is present, it is recommended to use the default sample group mechanism defined in ISO/IEC 14496-12 and include the operating points information sample group in the sample table box, rather than including it in each track fragment.

The grouping_type_parameter is not defined for the SampleToGroupBox with grouping type 'vopi'.

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord (ptl_max_temporal_id[i]+1) ptl[i];
    }
    unsigned int(1) all_independent_layers_flag;
    bit(7) reserved = 0;
```

-continued

```
    if (all_independent_layers_flag) {
        unsigned int(1) each_layer_is_an_ols_flag;
        bit(7) reserved = 0;
    } else
        unsigned int(8) ols_mode_idc;
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag;
        unsigned int(1) bit_rate_info_flag;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
    }
    unsigned int(8) max_layer_count;
    for (i=0; i<max_layer_count; i++) {
        unsigned int(8) layerID;
        unsigned int(8) num_direct_ref_layers;
        for (j=0; j<num_direct_ref_layers; j++)
            unsigned int(8) direct_ref_layerID;
        unsigned int(8) max_tid_il_ref_pics_plus1;
    }
}
class VvcOperatingPointsInformation extends VisualSampleGroupEntry ('vopi') {
    VvcOperatingPointsRecord oinf;
}
```

3.6.3.3. Semantics num_profile_tier_level_minus 1 plus 1 gives the number of following profiles, tier, and level combinations as well as the associated fields.

ptl_max_temporal_id[i]: Gives the maximum TemporalID of NAL units of the associated bitstream for the specified i-th profile, tier, and level structure.

NOTE: The semantics of ptl_max_temporal_id[i] and max_temporal_id of an operating point, given below, are different even though they may carry the same numerical value.

ptl[i] specifies the i-th profile, tier, and level structure.

all_independent_layers_flag, each_layer_is_an_ols_flag, ols_mode_idc and max_tid_il_ref_pics_plus1 aredefinedinISO/IEC23090-3.

num_operating_points: Gives the number of operating points for which the information follows.

output_layer_set_idx is the index of the output layer set that defines the operating point. The mapping between output_layer_set_idx and the layer_id values shall be the same as specified by the VPS for an output layer set with index output_layer_set_idx.

ptl_idx: Signals the zero-based index of the listed profile, level, and tier structure for the output layer set with index output_layer_set_idx.

max_temporal_id: Gives the maximum TemporalId of NAL units of this operating point.

NOTE: The maximum TemporalId value indicated in the layer information sample group has different semantics from the maximum TemporalId indicated here. However, they may carry the same literal numerical values.

layer_count: This field indicates the number of necessary layers, as defined ISO/IEC 23090-3, of this operating point.

layer_id: provides the nuh_layer_id values for the layers of the operating point.

is_outputlayer: A flag that indicates if the layer is an output layer or not. A one indicates an output layer.

frame_rate_info_flag equal to 0 indicates that no frame rate information is present for the operating point. The value 1 indicates that frame rate information is present for the operating point.

bit_rate_info flag equal to 0 indicates that no bitrate information is present for the operating point. The value 1 indicates that bitrate information is present for the operating point.

avgFrameRate gives the average frame rate in units of frames/(256 seconds) for the operating point. Value 0 indicates an unspecified average frame rate.

constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.

maxBitRate gives the maximum bit rate in bits/second of the stream of the operating point, over any window of one second.

avgBitRate gives the average bit rate in bits/second of the stream of the operating point.

max_layer_count: The count of all unique layers in all of the operating points that relate to this associated base track.

layerID: nuh_layer_id of a layer for which the all the direct reference layers are given in the following loop of direct_ref_layerID.

num_direct_ref_layers: The number of direct reference layers for the layer with nuh_layer_id equal to layerID.

direct_ref_layerID: nuh_layer_id of the direct reference layer.

3.6.4. Layer Information Sample Group

The list of layers and sublayers that a track carries is signalled in the Layer Information Sample Group. When more than one VVC track is present for the same VVC bitstream, each of these VVC tracks shall carry a 'linf' sample group.

When several VPSs are referenced by a VVC bitstream, it may be needed to include several entries in the sample group description box with grouping_type 'linf'. For more common cases where a single VPS is present, it is recommended to use the default sample group mechanism defined in ISO/IEC 14496-12 and include the Layer Information sample group in the sample table box, rather than including it in each track fragment.

The grouping_type_parameter is not defined for the SampleToGroupBox with grouping type 'linf'.

The syntax and semantics for the 'linf' sample group are specified in clauses 9.6.3.2 and 9.6.3.3, respectively.

3.6.5. Operating Point Entity Group 3.6.5.1. General

The operating point entity group is defined to provide a mapping of tracks to operating points and profile level information of the operating points.

The implicit reconstruction process when aggregating samples of the tracks mapped to an operating point described in this entity group does not require removing any further NAL units to result in a conforming VVC bitstream. Tracks belonging to an Operating Point Entity Group shall have a track reference track reference of type 'oref' to the group_id indicated in the Operating Point Entity Group.

All the entity_id values included in the operating point entity groups shall belong to the same VVC bitstream. When present, OperatingPointGroupBox shall be contained in the GroupsListBox in the movie-level MetaBox and shall not be contained in file-level or track-level MetaBoxes.

3.6.5.2. Syntax

```
aligned(8) class OperatingPointGroupBox extends EntityToGroupBox
('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag;
        unsigned int(1) bit_rate_info_flag;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

3.6.53. Semantics num_profile_tier_level_minus 1 plus 1 gives the number of following profiles, tier, and level combinations as well as the associated fields.

opeg_ptl[i] specifies the i-th profile, tier, and level structure.

num_operating_points: Gives the number of operating points for which the information follows.

output_layer_set_idx is the index of the output layer set that defines the operating point. The mapping between output_layer_set_idx and the layer_id values shall be the same as specified by the VPS for an output layer set with index output_layer_set_idx.

ptl_idx: Signals the zero-based index of the listed profile, level, and tier structure for the output layer set with index output_layer_set_idx.

max_temporal_id: Gives the maximum TemporalId of NAL units of this operating point.

NOTE: The maximum TemporalId value indicated in the layer information sample group has different semantics from the maximum TemporalId indicated here. However, they may carry the same literal numerical values.

layer_count: This field indicates the number of necessary layers, as defined ISO/IEC 23090-3, of this operating point.

layer_id: provides the nuh_layer_id values for the layers of the operating point.

is_outputlayer: A flag that indicates if the layer is an output layer or not. A one indicates an output layer.

frame_rate_info_flag equal to 0 indicates that no frame rate information is present for the operating point. The value 1 indicates that frame rate information is present for the operating point.

bit_rate_info flag equal to 0 indicates that no bitrate information is present for the operating point. The value 1 indicates that bitrate information is present for the operating point.

avgFrameRate gives the average frame rate in units of frames/(256 seconds) for the operating point. Value 0 indicates an unspecified average frame rate.

constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.

maxBitRate gives the maximum bit rate in bits/second of the stream of the operating point, over any window of one second.

avgBitRate gives the average bit rate in bits/second of the stream of the operating point.

entity_count specifies the number of tracks that are present in an operating point.

entity_idx specifies the index to the entity_id list in the entity group that belongs to an operating point.

4. Examples of Technical Problems Solved by Disclosed Technical Solutions

The latest designs of the VVC video file format regarding the storage of scalable WC bitstreams have the following problems:

1) When a VVC bitstream is represented by multiple VVC tracks, a file parser can identify the tracks needed for the chosen operating point by firstly finding all tracks with a VVC sample entry, and then find all tracks containing a 'vopi' sample group, and so on, to figure out information of all the operation points provided in the file. However, finding all these tracks can be pretty complicated.

2) The 'linf' sample group signals information on which layers and/or sublayers are included in the track. When using the 'vopi' sample group for choosing an OP, all tracks containing a 'linf' sample group need to be found and the information carried in the 'linf' sample group entries of these tracks is used together with the information in the 'vopi' sample group entry on the layers and/or sublayers for the OP to figure out the required tracks. These can be pretty complicated, too.

3) In the 'vopi' sample group entry, the layer dependency information is signalled even when the value of all_independent_layers_flag is equal to 1. However, the layer dependency information is known when all_independent_layers_flag is equal to 1 thus the bits for the signalling in this case are all wasted.

4) In the process for implicit reconstruction of a VVC bitstream from multiple tracks, removal of redundant EOS and EOB NAL units is specified. However, removal and/or rewriting of AUD NAL units in this process can be needed, but a corresponding process is missing.

5) It is specified that, when the 'opeg' entity group exists, the bitstream is reconstructed from multiple tracks by including all NAL units of the required tracks without removing any NAL units. However, this would disallow NAL units like AUD, EOS, and EOB NAL units for a particular AU, for example, to be included in more than one of the tracks carrying the VVC bitstream.

6) The container of the 'opeg' entity group box is specified to be the movie-level MetaBox. However, only when contained in the file-level MetaBox can the entity_id values of the entity group refer to track IDs.

7) In the 'opeg' entity group box, the field output_layer_set_idx is always signalled for each OP. However, if the OP contains only one layer, there is often no need to know the value of the OLS index, and even it is useful to know the OLS index, it can be easily derived to be the OLS index of the OLS that contains only the layer.

8) It is allowed that when an 'opeg' entity group exists for a VVC bitstream, one of the tracks representing the VVC bitstream can have a 'vopi' sample group. However, allowing both is unnecessary and would be just unnecessarily increase the file size, and can confuse file parsers on which one should be used.

5. A Listing of Solutions

To solve the above problems, methods as summarized below are disclosed. The items should be considered as examples to explain the general concepts and should not be interpreted in a narrow way. Furthermore, these items can be applied individually or combined in any manner.

1) To solve problem 1, one or more of the following items are proposed:
   a. Add signalling of file-level information on all OPs provided in the file, including tracks required for each OP, while the required tracks for an OP may carry layers or sublayers that are not included in the OP.
   b. Add signalling of file-level information on which tracks contain 'vopi' sample groups.
      i. In one example, specify a new box, e.g., named the operating points information tracks box, with the file-level MetaBox as the container, for signalling of the tracks that carry the 'vopi' sample group
      A piece of file-level information can be signalled in a file-level box or a movie-level box, or in a track-level box but the location of the track-level box is identified in a file-level box or a movie-level box.

2) To solve problem 2, one or more of the following items are proposed:
   a. Add information on required tracks for each OP in the 'vopi' sample group entry.
   b. Deprecate the use of the 'linf' sample group.

3) To solve problem 3, skip the signalling of layer dependency information in the 'vopi' sample group entry when all_independent_layers_flag is equal to 1.

4) To solve problem 4, in the process for implicit reconstruction of a VVC bitstream from multiple tracks, add an operation for removal of redundant AUD NAL units.
   a. Alternatively, further add an operation for rewriting of AUD NAL units when needed.
      i. In one example, it is specified that, when reconstructing an access unit from multiple picture units from different tracks, when the AUD NAL unit kept in the reconstructed access unit has aud_irap_or_gdr_flag equal to 1 and the reconstructed access unit is not an IRAP or GDR access unit, the value of aud_irap_or_gdr_flag of the AUD NAL unit is set equal to 0.

ii. It is possible that the AUD NAL unit in the first PU has aud_irap_or_gdr_flag equal to 1, and another PU for the same access unit but in a separate track has a picture that is not an IRAP or GDR picture. In this case, the value of aud_irap_or_gdr_flag of the AUD NAL unit in the reconstructed access unit is changed from 1 to 0.

b. In one example, additionally or alternatively, it is specified that, when at least one of the multiple picture units from different tracks for an access unit has an AUD NAL unit, the first picture unit (i.e., the picture unit with the smallest value of nuh_layer_id) shall have an AUD NAL unit.

c. In one example, it is specified that, when multiple picture units from different tracks for an access unit have AUD NAL units present, only the AUD NAL unit in the first picture unit is kept in the reconstructed access unit.

5) To solve problem 5, one or more of the following items are proposed:

a. Specify that when the 'opeg' entity group exists and is used, the required tracks provide the exact set of VCL NAL units needed for each OP, but some of the non-VCL NAL units may become redundant in the reconstructed bitstream and thus may need to be removed.

i. Alternatively, specify that when the 'opeg' entity group exists and is used, the required tracks provide the exact set of layers and sublayers needed for each OP, but some of the non-VCL NAL units may become redundant in the reconstructed bitstream and thus may need to be removed.

b. In the process for implicit reconstruction of a VVC bitstream from multiple tracks, apply the operation for removal of redundant EOB and EOS NAL units even when the 'opeg' entity group exists and is used.

c. In the process for implicit reconstruction of a VVC bitstream from multiple tracks, apply the operation for removal of redundant AUD units and the operation for rewriting of redundant AUD units even when the 'opeg' entity group exists and is used.

6) To solve problem 6, the container of the 'opeg' entity group box is specified to be the GroupsListBox in the file-level MetaBox, as follows: When present, OperatingPointGroupBox shall be contained in the GroupsListBox in the file-level MetaBox and shall not be contained in MetaBoxes of other levels.

7) To solve problem 7, the signalling of the output_layer_set_idx field in the VvcOperatingPointsRecord present in the 'vopi' sample group entry, and in the 'opeg' entity group box, OperatingPointGroupBox, is skipped for an OP when the OP contains only one layer.

a. In one example, the output_layer_set_idx field in VvcOperatingPointsRecord and/or OperatingPointGroupBox is moved after the loop for signalling of layer_id, and is conditioned on "if (layer_count>1)".

b. In one example, furthermore, it is specified that, when output_layer_set_idx is not present for an OP, its value is inferred to be equal to the OLS index of the OLS that contains only the layer in the OP.

8) To solve problem 8, it is specified that when an 'opeg' entity group exists for a VVC bitstream, none of the tracks representing the VVC bitstream shall have a 'vopi' sample group.

a. Alternatively, allow both to exist, but require that, when both exist, they are required to be consistent, such that there is no difference between choosing either of them.

b. In one example, it is specified that tracks belonging to an 'opeg' entity group, which all have a track reference of type 'oref' to the group_id indicated in the entity group, shall not carry a 'vopi' sample group.

9) It may be specified that, when a VVC bitstream is represented only in one track, is it disallowed to have either an 'opeg' entity group or 'vopi' sample group for the VVC bitstream.

6. Embodiment Examples

Below are some example embodiments for some of the invention aspects summarized above in Section 5, which can be applied to the standard specification for VVC video file format. The changed texts are based on the latest draft specification of VVC. Most relevant parts that have been added or modified are highlighted in boldfaced underline, and some of the deleted parts are highlighted in [[bold face italics]]. There may be some other changes that are editorial in nature and thus not highlighted.

6.1. First Embodiment

This embodiment is for items 2a, 3, 7, 7a, 7b.

6.1.1. Operating Points Information Sample Group 6.1.1.1. Definition

Applications are informed about the different operating points provided by a given VVC bitstream and their constitution by using the Operating Points Information sample group ('vopi'). Each operating point is related to an output layer set, a max TemporalId value, and a profile, level and tier signalling. All this information is captured by the 'vopi' sample group. Apart from this information, this sample group also provides the dependency information between layers.

When more than one VVC track is present for a VVC bitstream and no Operating Point entity group is present for the VVC bitstream, both of the following apply:

Among the VVC tracks for the VVC bitstream there shall be one and only one track that carries a 'vopi' sample group.

All the other VVC tracks of the VVC bitstream shall have a track reference of type 'oref' to the track that carries the 'vopi' sample group.

For any specific sample in a given track, the temporally collocated sample in another track is defined as the one with the same decoding time as that of this specific sample. For each sample $S_N$ in a track $T_N$ that has an 'oref' track reference to the track $T_k$ that carries the 'vopi' sample group, the following applies:

If there is a temporally collocated sample $S_k$ in the track $T_k$, then the sample $S_N$ is associated with the same 'vopi' sample group entry as the sample $S_k$.

Otherwise, the sample $S_N$ is associated with the same 'vopi' sample group entry as the last of the samples in the track $T_k$ that precede the sample $S_N$ in decoding time.

When several VPSs are referenced by a VVC bitstream, it may be needed to include several entries in the sample group description box with grouping_type 'vopi'. For more common cases where a single VPS is present, it is recommended to use the default sample group mechanism defined in ISO/IEC 14496-12 and include the operating points information sample group in the sample table box, rather than including it in each track fragment.

The grouping_type_parameter is not defined for the SampleToGroupBox with grouping type 'vopi'.

6.1.1.2. Syntax

```
class VvcOperatingPointsRecord {
  unsigned int(8) num_profile_tier_level_minus1;
  for (i=0; i<=num_profile_tier_level_minus1; i++) {
    unsigned int(8) ptl_max_temporal_id[i];
    VvcPTLRecord(ptl_max_temporal_id[i]+1) ptl[i];
  }
  unsigned int(1) all_independent_layers_flag;
  bit(7) reserved = 0;
  if (all_independent_layers_flag) {
    unsigned int(1) each_layer_is_an_ols_flag;
    bit(7) reserved = 0;
  } else
    unsigned int(8) ols_mode_idc;
  unsigned int(16) num_operating_points;
  for (i=0; i<num_operating_points) {
    [[unsigned int (16) output_layer_set_idx;]]
    unsigned int(8) ptl_idx;
    unsigned int(8) max_temporal_id;
    unsigned int(8) layer_count;
    for (j=0; j<layer_count; j++) {
      unsigned int(6) layer_id;
      unsigned int(1) is_outputlayer;
      bit(1) reserved = 0;
    }
    if (layer count>1)
      unsigned int(16) output layer set idx;
      unsigned int(8) op track count;
      for (j=0; j<op track count; j++) {
        unsigned int(32) op_track_id[j];
      }
    bit(6) reserved = 0;
    unsigned int(1) frame_rate_info_flag
    unsigned int(1) bit_rate_info_flag
    if (frame_rate_info_flag) {
      unsigned int(16) avgFrameRate;
      bit(6) reserved = 0;
      unsigned int(2) constantFrameRate;
    }
    if (bit_rate_info_flag) {
      unsigned int(32) maxBitRate;
      unsigned int(32) avgBitRate;
    }
  }
  if (!all independent layers flag){
    unsigned int(8) max layer count;
    for (i=0; i<max layer count; i++) {
      unsigned int(8) layerID;
      unsigned int(8) num direct ref layers;
      for (j=0; j<num_direct_ref_layers; j++)
        unsigned int(8) direct ref layerID;
      unsigned int (8) max tid il ref pics plus1;
    }
  }
}
class VvcOperatingPointsInformation extends VisualSampleGroupEntry
('vopi') {
  VvcOperatingPointsRecord oinf;
}
```

6.1.13. Semantics
...

num_operating_points: Gives the number of operating points for which the information follows.

[[output_layer_set_idx is the index of the output layer set that defines the operating point. The mapping between output_layer_set_idx and the layer_id values shall be the same as specified by the VPS for an output layer set with index output_layer_set_idx.]]

ptl_idx: Signals the zero-based index of the listed profile, level, and tier structure for the output layer set with index output_layer_set_idx.

max_temporal_id: Gives the maximum TemporalId of NAL units of this operating point.

NOTE: The maximum TemporalId value indicated in the layer information sample group has different semantics from the maximum TemporalId indicated here. However, they may carry the same literal numerical values.

layer_count: This field indicates the number of necessary layers, as defined ISO/IEC 23090-3, of this operating point.

layer_id: provides the nuh_layer_id values for the layers of the operating point.

is_outputlayer: A flag that indicates if the layer is an output layer or not. A one indicates an output layer.

output_layer_set_idx is the index of the output layer set that defines the operating point.

The mapping between output_layer_set_idx and the layer_id values shall be the same as specified by the VPS for an output layer set with index output_layer_set_idx. When output_layer_set_idx is not present for an OP, its value is inferred to be equal to the OLS index of the OLS that contains only the layer in the OP.

op_track_count specifies the number of tracks that carry VCL NAL units in this operating point.

op_track_id[j] specifies the track ID value of the j-th track of the tracks that carry VCL NAL units this operating point.

frame_rate_info_flag equal to 0 indicates that no frame rate information is present for the operating point. The value 1 indicates that frame rate information is present for the operating point.

bit_rate_info_flag equal to 0 indicates that no bitrate information is present for the operating point. The value 1 indicates that bitrate information is present for the operating point.

avgFrameRate gives the average frame rate in units of frames/(256 seconds) for the operating point. Value 0 indicates an unspecified average frame rate.

constant FrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.

maxBitRate gives the maximum bit rate in bits/second of the stream of the operating point, over any window of one second.

avgBitRate gives the average bit rate in bits/second of the stream of the operating point.

max_layer_count: The count of all unique layers in all of the operating points that relate to this associated base track.

layerID: nuh_layer_id of a layer for which the all the direct reference layers are given in the following loop of direct_ref_layerID.

num_direct_ref_layers: The number of direct reference layers for the layer with nuh_layer_id equal to layerID.

direct_ref_layerID: nuh_layer_id of the direct reference layer.

6.2. Second Embodiment

This embodiment is for items 1.*b.i*, 4, 4*a*, 4.*a.i*, 4*b*, 4*c*, 5*a*, 6, 8, and 8*b*.

Implicit reconstruction of a VVC bitstream

When the Operating Points Information sample group is present, the required tracks are selected based on the layers they carry and their reference layers as indicated by the Operating Points Information and Layer Information sample groups.

When the Operating Points Entity Group is present, the required tracks are selected based on the information in the OperatingPointGroupBox.

When reconstructing a bitstream containing a sublayer for which the VCL NAL units have TemporalId greater than 0, all lower sublayers (i.e., those for which the VCL NAL units have smaller TemporalId) within the same layer are also included in the resulting bitstream and the required tracks are selected accordingly.

When reconstructing an access unit, picture units (as specified in ISO/IEC 23090-3) from samples having the same decoding time are placed into the access unit in increasing order of the nuh_layer_id value. When at least one of the multiple picture units for an access unit has an AUD NAL unit, the first picture unit (i.e., the picture unit with the smallest value of nuh layer id) shall have an AUD NAL unit, and only the AUD NAL unit In the first picture unit is kept in the reconstructed access unit, while other AUD NAL units, when present, are discarded. In such a reconstructed access unit when the AUD NAL unit has and irap or gdr flag equal to 1 and the reconstructed access unit is not an IRAP or GDR access unit, the value of and irap or gdr flag of the AUD NAL unit is set equal to 0.

> NOTE 1: It is possible that the AUD NAL unit in the first PU has and trap or gdr flag equal to 1, and another PU for the same access unit but in a separate track has a picture that Is not an IRAP or GDR picture. In this case, the value of and trap or gdr flag of the AUD NAL unit in the reconstructed access unit is changed from 1 to 0.

. . .

Entity Groups and Other File-Level Information
Subpicture Entity Groups

. . .

Operating Point Entity Group
General

The operating point entity group is defined to provide a mapping of tracks to operating points and profile level information of the operating points.

The implicit reconstruction process when aggregating samples of the tracks mapped to an operating point described in this entity group does not require removing any further VCL NAL units to result in a conforming VVC bitstream. Tracks belonging to an Operating Point Entity Group shall have a track reference of type 'oref' to the group_id indicated in the Operating Point Entity Group and shall not carry a 'vopi' sample group.

All the entity_id values included in the operating point entity groups shall belong to the same VVC bitstream. When present, OperatingPointGroupBox shall be contained in the GroupsListBox in the file-level MetaBox and shall not be contained in MetaBoxes of other levels.

Operating Points Information Tracks Box
Definition
   Box Type: 'topi'
   Container: file-level MetaBox
   Mandatory: No
   Quantity: Zero or one The operating points information tracks box contains the track IDs of the set of tracks that carry a 'vopi' sample group. The absence of this box indicates that there is no track in the file carrying a 'vopi' sample group.

Syntax

```
aligned(8) class OperatingPointsInfoTracksBox extends
FullBox('topi',0,0)
{
   unsigned int(8) num_tracks_with_vopi;
   for (i=0; i< num_tracks_with_vopi; i++)
      unsigned int(32) track_ID[i];
}
```

Semantics
   num_tracks_with_vopi specifies the number of tracks in the file that carry a 'vopi' sample group.
   track_ID[i] specifies the track ID of the i-th track that carries a 'vopi' sample group.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
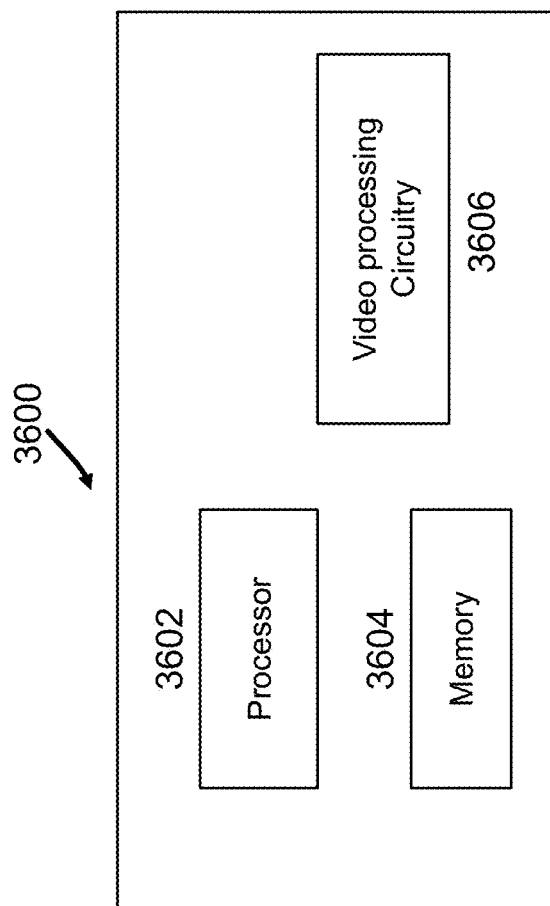
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
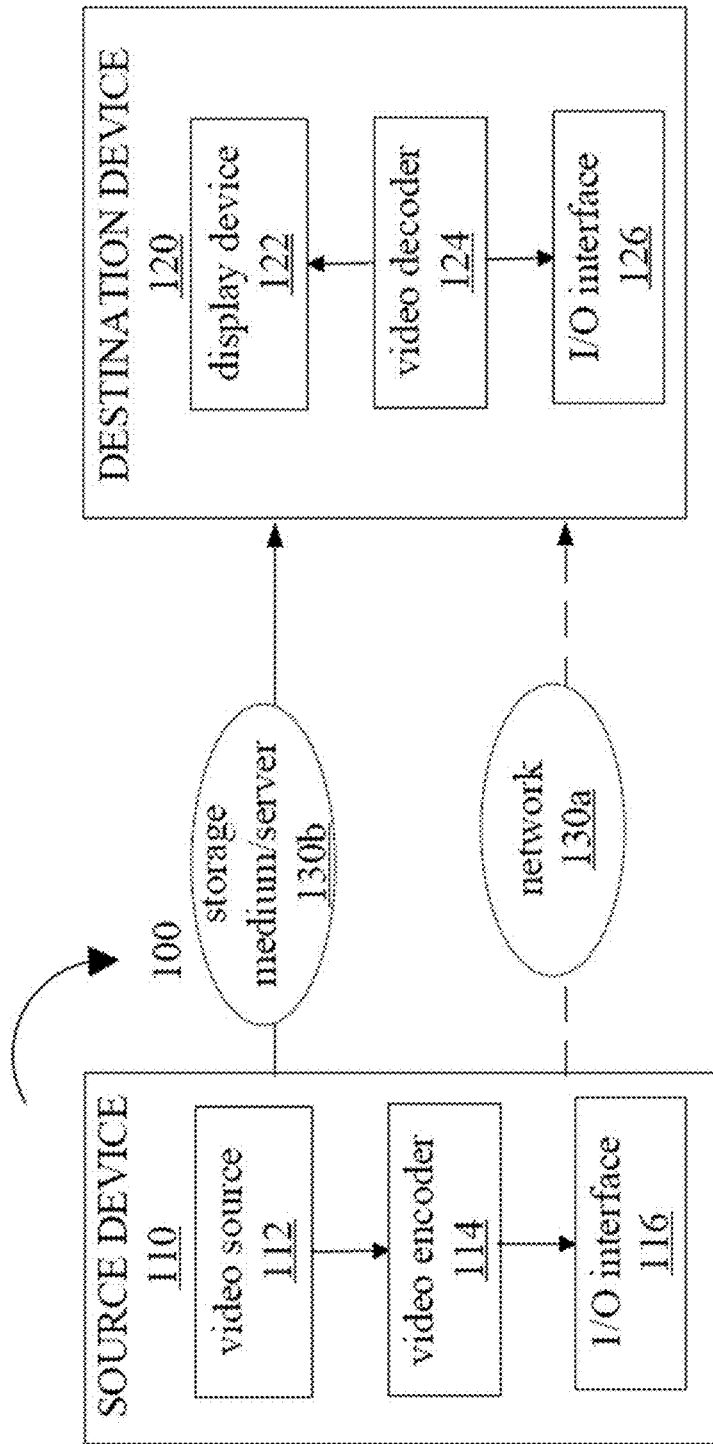
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
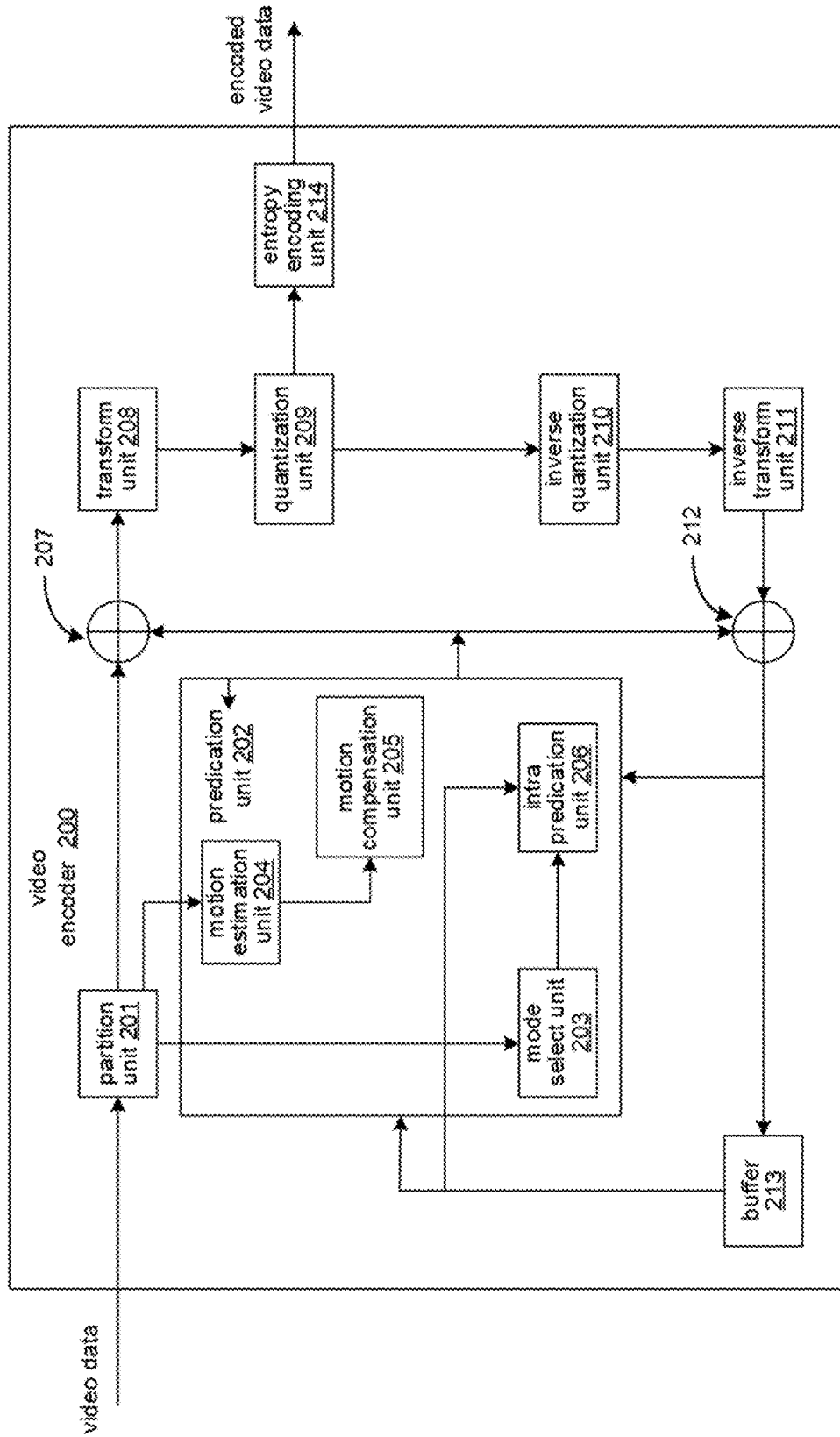
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
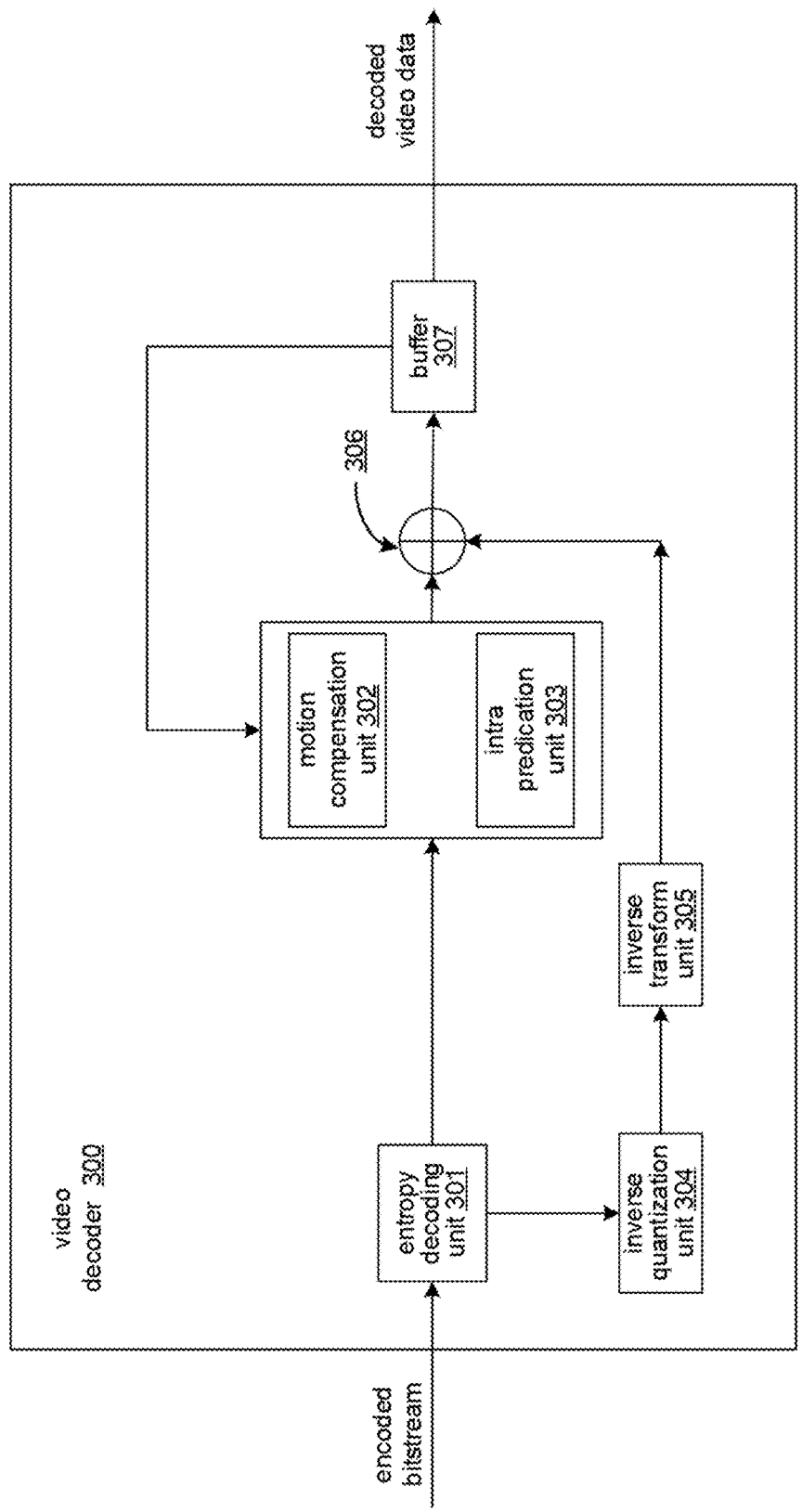
FIG. 6 is a block diagram that illustrates a decoder in accordance with some embodiments of the present disclosure.
Figure 7:
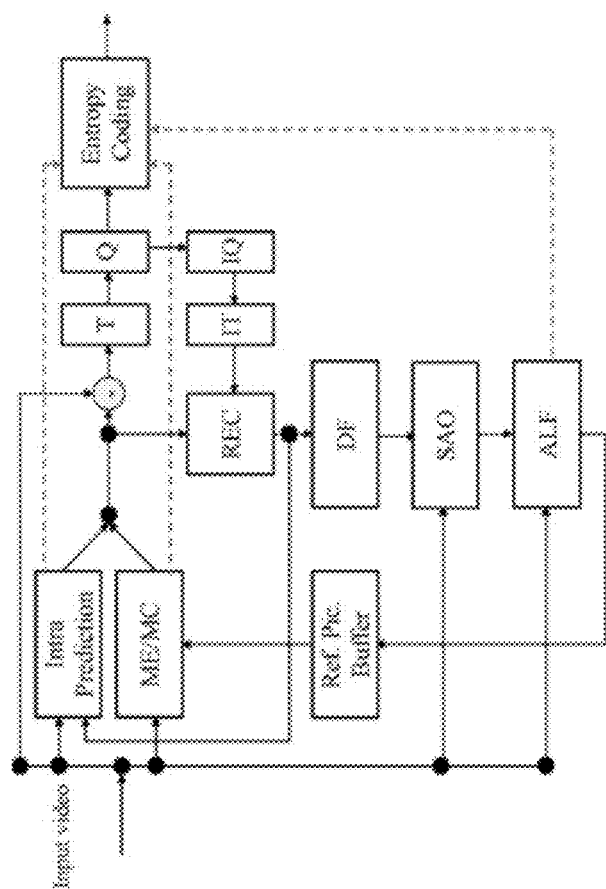
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., items 1, 2).

Figure 3:
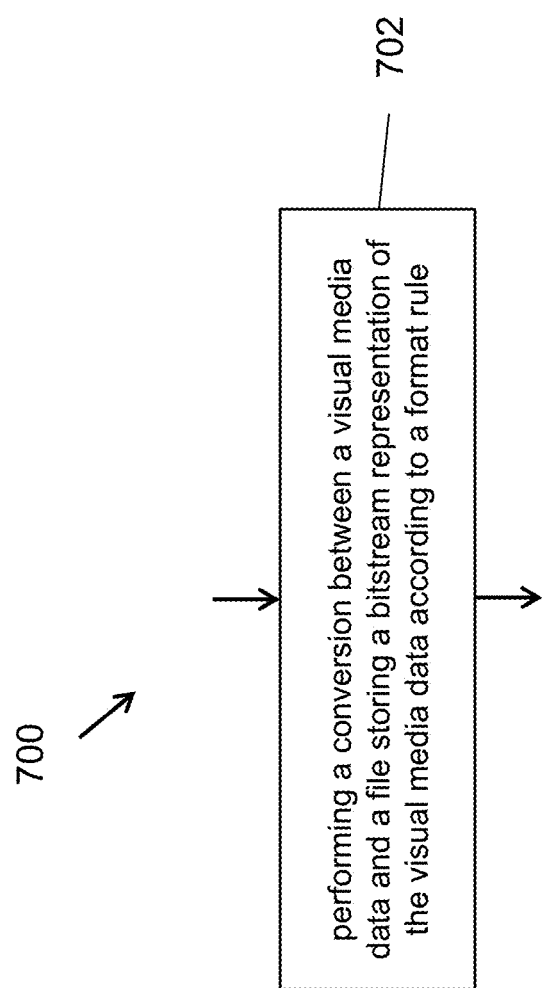
FIG. 3 is a flowchart for an example method of video processing.

1. A visual media processing method (e.g., method 700 depicted in FIG. 3), comprising: performing (702) a conversion between a visual media data and a file storing a bitstream representation of the visual media data according to a format rule; wherein the file includes a file-level information of all operation points includes in the file, wherein the file-level information includes information of tracks required for each operation point.

2. The method of solution 1, wherein the format rule permits a track to include layers and sublayers not required for a corresponding operation point.

3. The method of any of solutions 1-2, wherein the information of tracks required for each operation point is included in a vopi sample group entry.

The following solutions show example embodiments of techniques discussed in the previous section (e.g., item 3).

4. A visual media processing method, comprising: performing a conversion between a visual media data and a file storing a bitstream representation of the visual media data according to a format rule; wherein the format rule specifies that layer dependency information is skipped from a vopi sample group entries in case that all layers are independent.

The following solutions show example embodiments of techniques discussed in the previous section (e.g., items 5, 6).

5. A visual media processing method, comprising: performing a conversion between a visual media data and a file storing a bitstream representation of the visual media data according to a format rule; wherein the format rule defines a rule associated with handling of an operation point entity group (opeg) in the bitstream representation.

6. The method of solution 5, wherein the format rule specifies that, in case that the opeg exists, each required track in the file provides an exact set of video coding layer network abstraction layer (VCL NAL) corresponding to each operation point in the opeg.

7. The method of solution 6, wherein the format rule permits inclusion of non-VCL units in the tracks.

The following solutions show example embodiments of techniques discussed in the previous section (e.g., item 4).

8. A visual media processing method, comprising: performing a conversion between a visual media data and a file storing a bitstream representation of the visual media data according to a rule; wherein the conversion includes performing an implicit reconstruction of the bitstream representation from multiple tracks in which redundant access unit delimiter network access units (AUD NAL) are processed according to a rule.

9. The method of solution 8, wherein the rule specifies that the AUD NAL units are removed.

10. The method of solution 8, wherein the rule specifies that the AUD NAL units are rewritten.

11. The method of any of solutions 8-10, wherein the rule specifies that, in case that at least one of multiple picture units from different tracks for an access unit has an AUD NAL unit, the first picture unit has another AUD NAL unit.

12. The method of any of solutions 8-10, wherein the rule specifies that, in case that multiple picture units from different tracks for an access unit have AUD NAL units present, only an AUD NAL unit in a first picture unit is kept in a reconstructed access unit during decoding.

13. The method of any of solutions 1-12, wherein the conversion comprises generating a bitstream representation of the visual media data and storing the bitstream representation to the file according to the format rule.

14. The method of any of solutions 1-12, wherein the conversion comprises parsing the file according to the format rule to recover the visual media data.

15. A video decoding apparatus comprising a processor configured to implement a method recited in one or more of solutions 1 to 14.

16. A video encoding apparatus comprising a processor configured to implement a method recited in one or more of solutions 1 to 14.

17. A computer program product having computer code stored thereon, the code, when executed by a processor, causes the processor to implement a method recited in any of solutions 1 to 14.

18. A computer readable medium on which a bitstream representation complying to a file format that is generated according to any of solutions 1 to 14.

19. A method, apparatus or system described in the present document.

Some preferred embodiments of the solutions listed above may include the following (e.g., items 1, 2).

Figures 9A, 9B:
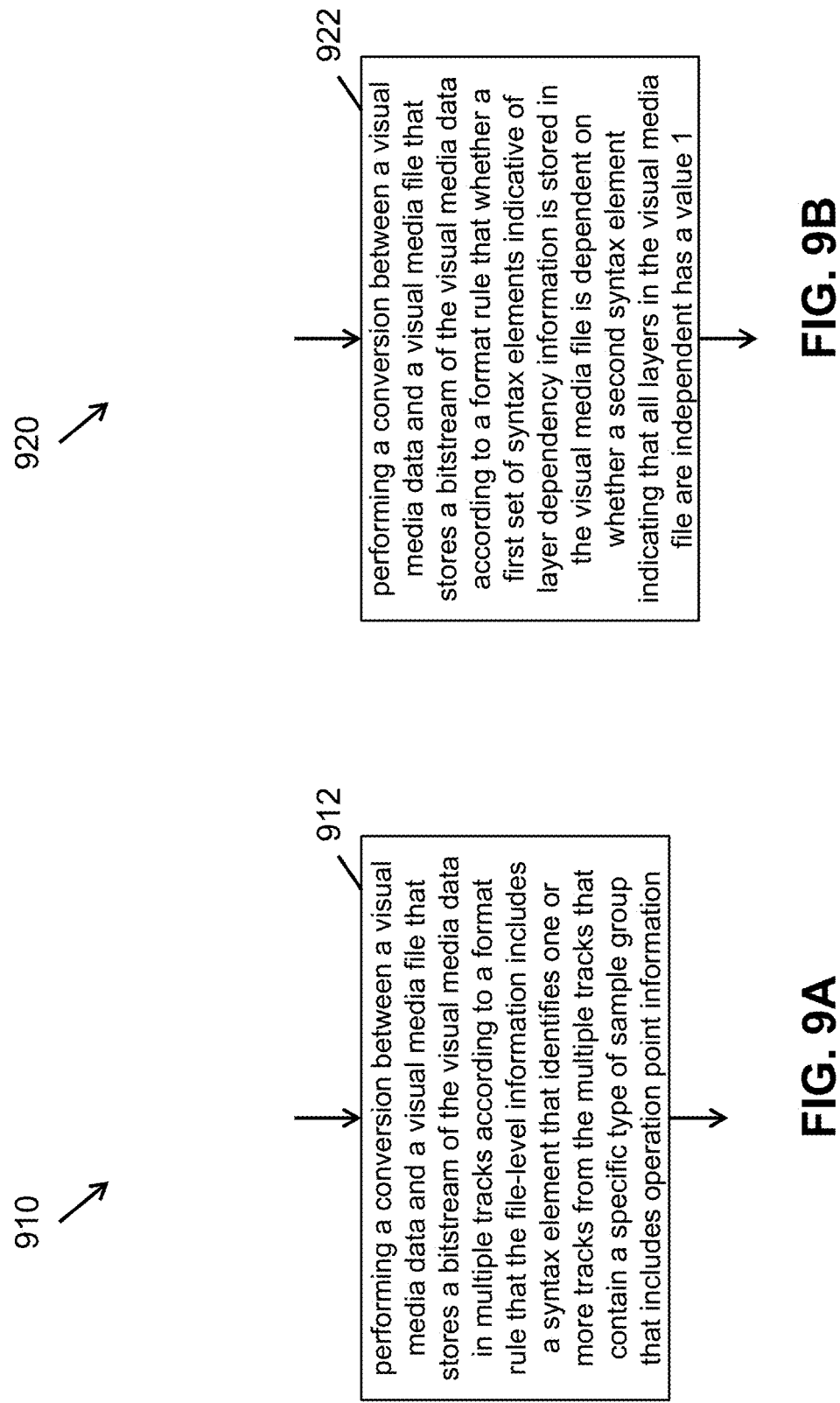
FIGS. 9A to 9F depict flowcharts for example methods of visual media processing.

In some embodiments, a method of processing visual media (e.g., method 910 depicted in FIG. 9A) includes performing (912) a conversion between a visual media data and a visual media file that stores a bitstream of the visual media data in multiple tracks according to a format rule that specifies that the file-level information includes a syntax element that identifies one or more tracks from the multiple tracks that contain a specific type of sample group that includes operation point information.

In the above embodiments, the format rule specifies that the visual media file includes a file-level information of all operation points provided in the visual media file, wherein the format rule further specifies that the file-level information includes, for each operation point, information of corresponding tracks in the visual media file.

In some embodiments, the format rule permits a track required for a particular operation point to include layers and sublayers not required for the particular operation point.

In some embodiments, wherein the syntax element comprises a box comprising a file-level container.

In some embodiments, format rule specifies that the file-level information is included in a file-level box.

In some embodiments, in format rule specifies that the file-level information is included in a movie-level box.

In some embodiments, the format rule specifies that the file-level information is included in a track-level box that is identified in another track-level box or another file-level box.

In some embodiments, the format rule further specifies that the specific type of sample group includes information on required tracks for each operation point.

In some embodiments, the format rule further specifies that the information on the required tracks for each operation point is omitted from another specific type of sample group that includes layer information regarding a number of layers in the bitstream.

In some embodiments, the visual media data is processed by a versatile video coding (WC), and the multiple tracks are VVC tracks.

Some preferred embodiments may include the following (e.g., item 3).

In some embodiments, a method of visual media processing (e.g., method 920 depicted in FIG. 9B) includes performing (922) a conversion between a visual media data and a visual media file that stores a bitstream of the visual media data according to a format rule. The visual media file stores one or more tracks comprising one or more video layers. The format rule specifies that whether a first set of syntax elements indicative of layer dependency information is stored in the visual media file is dependent on whether a second syntax element indicating that all layers in the visual media file are independent has a value 1.

In some embodiments, the first set of syntax elements is stored in a sample group that indicates information about one or more operation points stored in the visual media file.

In some embodiments, the format rule specifies that, responsive to the second syntax element having the value 1, the first set of syntax elements is omitted from the visual media file.

Some preferred embodiments of the solutions listed above may incorporate the following aspects (e.g., item 4).

Figures 9C, 9D:
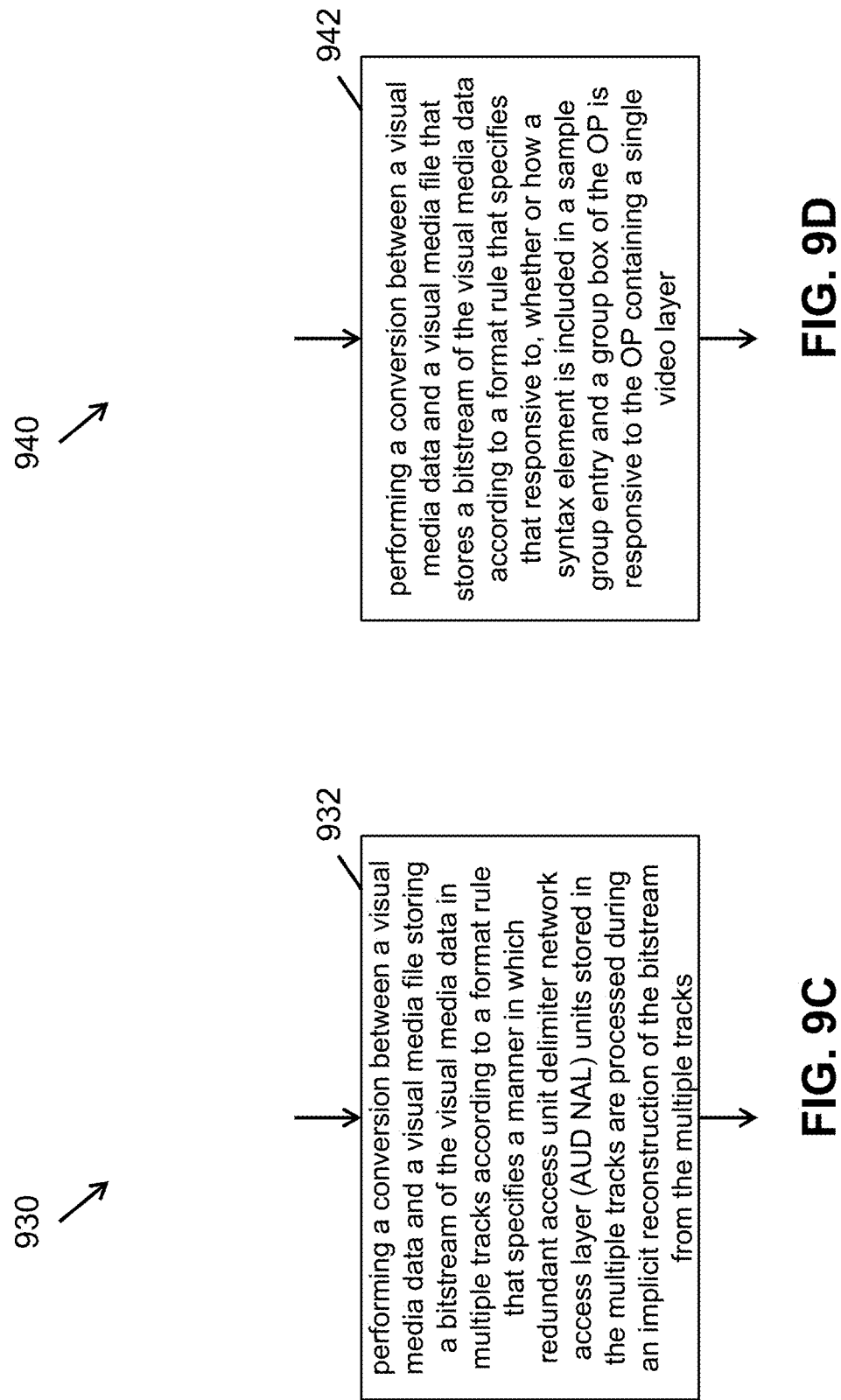

In some embodiments, a method of processing visual media data (e.g., method 930 depicted in FIG. 9C) includes performing (932) a conversion between a visual media data and a visual media file storing a bitstream of the visual media data in multiple tracks according to a format rule that specifies a manner in which redundant access unit delimiter network access layer (AUD NAL) units stored in the multiple tracks are processed during an implicit reconstruction of the bitstream from the multiple tracks.

In some embodiments, the format rule specifies that the redundant AUD NAL units are removed during the implicit reconstruction.

In some embodiments, the format rule specifies that the redundant AUD NAL units are rewritten during the implicit reconstruction.

In some embodiments, the format rule specifies that, responsive to the implicit reconstruction including generating a particular access unit having a particular type different from an instantaneous random access point type or a gradual decoding refresh type from multiple pictures of multiple tracks, a syntax field of a particular redundant AUD NAL included in the particular access unit is rewritten to a 0 value indicating that the particular redundant AUD NAL does not represent the instantaneous random access point or the gradual decoding refresh type.

In some embodiments, the format rule further specifies that a value of a syntax element in an AUD NAL unit in a first picture unit (PU) is rewritten to 0 indicating that the particular AUD NAL does not represent the instantaneous random access point or the gradual decoding refresh type in case that a second PU from a different track includes a picture that is not an intra random access point picture or a gradual decode refresh picture.

In some embodiments, the format rule specifies that responsive to at least one of multiple picture units from different tracks for an access unit having a first AUD NAL unit, a first picture unit of the access unit generated from the implicit reconstruction includes a second AUD NAL unit.

In some embodiments, the format rule specifies that responsive to multiple picture units from different tracks for an access unit include AUD NAL units, a single AUD NAL unit corresponding to that of a first picture unit is included in the access unit generated from the implicit reconstruction.

Some preferred embodiments of the solutions listed above may incorporate the following aspects (e.g., item 7).

In some embodiments, a visual media processing method (e.g., method 940 depicted in FIG. 9D) includes performing (942) a conversion between a visual media data and a visual media file that stores a bitstream of the visual media data according to a format rule. The visual media file stores one or more tracks comprising one or more video layers. The visual media file includes information of an operation point (OP); wherein the format rule specifies that responsive to, whether or how a syntax element is included in a sample group entry and a group box of the OP is responsive to the OP containing a single video layer; wherein the syntax element is configured to indicate an index to an output layer set for the OP.

In some embodiments, the format rule specifies that, responsive to the OP containing the single video layer, the syntax element is omitted from the sample group entry and the group box.

In some embodiments, the format rule specifies that, responsive to the OP containing more than one video layers, the syntax element is included after indicating information identifying the more than one video layers.

In some embodiments, in response to omitting the syntax element from the sample group entry and the group box, the index to the output layer set for the OP is inferred to be equal to an index of an output layer set that includes the single video layer.

Some preferred embodiments of the solutions listed above may incorporate the following aspects (e.g., item 8).

Figures 9E, 9F:
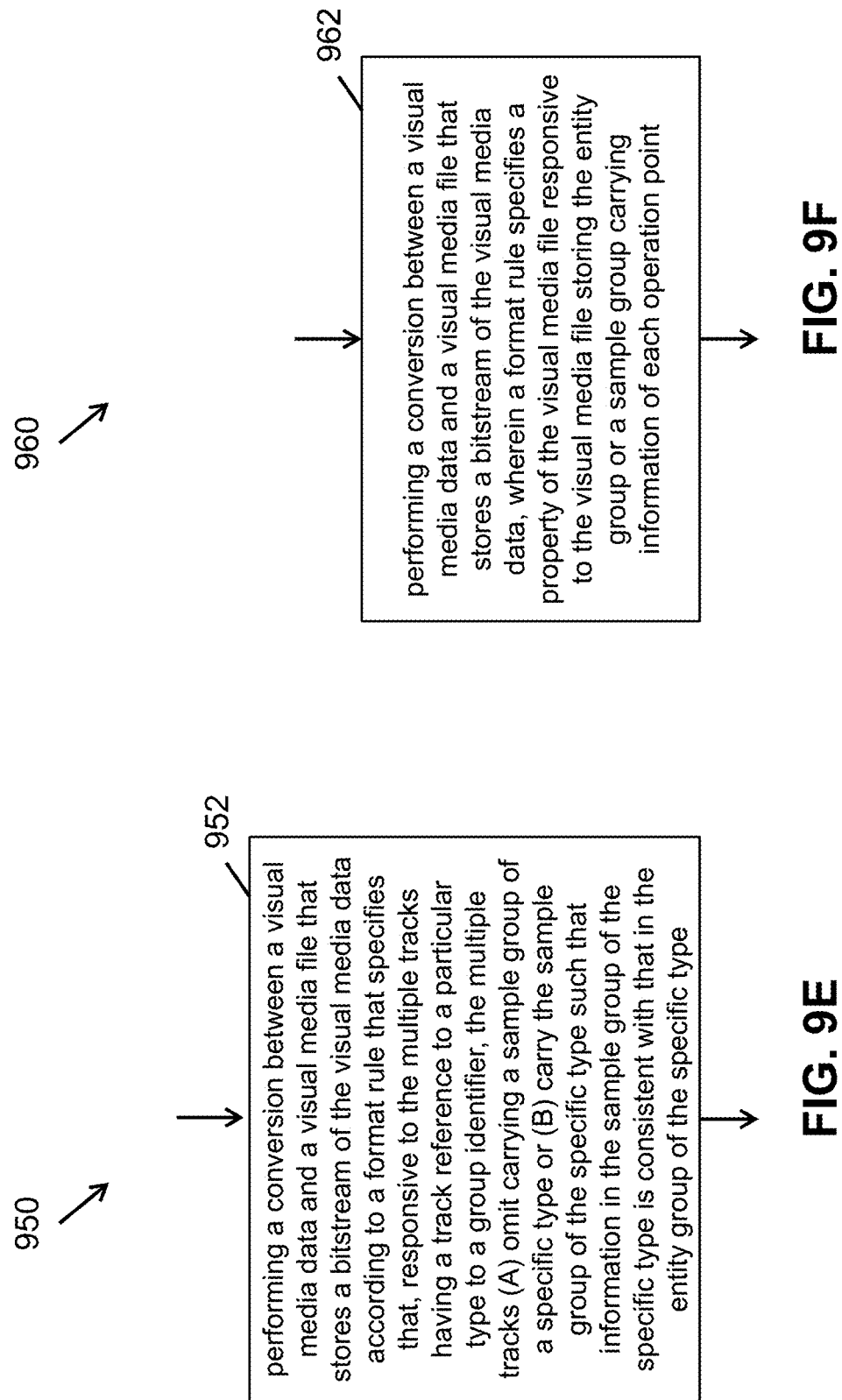

In some embodiments, a visual media processing method (e.g., method 950 depicted in FIG. 9E) includes performing (952) a conversion between a visual media data and a visual media file that stores a bitstream of the visual media data according to a format rule; wherein the visual media file stores multiple tracks that belong to an entity group of a specific type, and wherein the format rule specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type.

In some embodiments, the multiple tracks represent the bitstream.

In some embodiments, the entity group of the specific type indicates that the multiple tracks exactly correspond to an operation point.

4 In some embodiments, the sample group of the specific type includes information about which tracks of the multiple tracks correspond to the operation point.

Some preferred embodiments of the solutions listed above may incorporate the following aspects (e.g., items 5, 6, 9).

In some embodiments, a visual media processing method (e.g., method 960 depicted in FIG. 9F) includes performing (962) a conversion between a visual media data and a visual media file that stores a bitstream of the visual media data;

wherein the visual media file comprises multiple tracks; wherein the visual media file stores an entity group that carries information regarding operation points in the visual media file and tracks carrying each operation point; and wherein a format rule specifies a property of the visual media file responsive to the visual media file storing the entity group or a sample group carrying information of each operation point.

In some embodiments, the format rule specifies that the entity group provides a set of tracks carrying an exact set of video coding layer (VCL) network abstraction layer (NAL) units for each operation point.

In some embodiments, the format rule further specifies that, during reconstruction of the bitstream, non-VCL NAL units that are in the set of tracks and are redundant are removed.

4 In some embodiments, the format rule specifies that the entity group provides a set of tracks carrying an exact set of one or more layers and one or more sublayers for each operation point.

In some embodiments, the format rule further specifies that, during reconstruction of the bitstream, non-video coding layer (VCL) network abstraction layer (NAL) units that are in the set of tracks and are redundant are removed.

In some embodiments, the format rule specifies that, in a process of reconstruction of a bitstream from the multiple tracks, redundant end of bitstream (EOB) or end of stream (EOS) network abstraction layer (NAL) units are removed.

In some embodiments, the format rule specifies that, in a process of reconstruction of bitstream from the multiple tracks, access delimiter units (AUD) are removed or rewritten.

In some embodiments, the format rule specifies the property that a container of an entity group box associated with the entity group is disallowed from being stored in the visual media file at any level except for a pre-specified file-level box.

In some embodiments, the pre-specified file-level box is a group list box that is included in a file-level metadata box.

In some embodiments, the format rule specifies that, responsive to the bitstream being stored in a single track in the visual media file, either the entity group and/or the sample group are disallowed from being stored for the bitstream.

In the several embodiments described above, the conversion comprises storing the bitstream to the visual media file according to the format rule.

In the several embodiments described above, the conversion comprises parsing the visual media file according to the format rule to reconstruct the bitstream.

In some embodiments, a visual media file parsing apparatus may include a processor configured to implement a method disclosed in the above-described embodiments.

In some embodiments, a visual media file writing apparatus includes a processor configured to implement a method disclosed in the above-described embodiments.

Some embodiments may comprise of a computer program product having computer code stored thereon. The code, when executed by a processor, causes the processor to implement a method recited in any of the above-described embodiments.

Some embodiments may comprise a computer readable medium on which a visual media file complying to a file format that is generated according to any of the above-described methods is stored.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation. The term "visual media" may refer to video or images and the term visual media processing may refer to video processing or image processing.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A visual media processing method, comprising:
performing a conversion between a visual media data and a visual media file that stores a bitstream of the visual media data according to a format rule;
wherein the visual media file stores multiple tracks that belong to an entity group of a specific type, and
wherein the format rule specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type.

2. The method of claim 1, wherein the multiple tracks represent the bitstream.

3. The method of claim 1, wherein the entity group of the specific type indicates that the multiple tracks exactly correspond to an operation point.

4. The method of claim 1, wherein the sample group of the specific type includes information about which tracks of the multiple tracks correspond to the operation point.

5. The method of claim 1,
wherein the visual media file stores a bitstream of the visual media data;
wherein the visual media file stores an entity group that carries information regarding operation points in the visual media file and tracks carrying each operation point; and
wherein the format rule specifies a property of the visual media file responsive to the visual media file storing the entity group or a sample group carrying information of each operation point.

6. The method of claim 5, wherein the format rule specifies that the entity group provides a set of tracks carrying an exact set of video coding layer (VCL) network abstraction layer (NAL) units for each operation point.

7. The method of claim 6, wherein the format rule further specifies that, during reconstruction of the bitstream, non-VCL NAL units that are in the set of tracks and are redundant are removed.

8. The method of claim 5, wherein the format rule specifies that the entity group provides a set of tracks carrying an exact set of one or more layers and one or more sublayers for each operation point.

9. The method of claim 6, wherein the format rule further specifies that, during reconstruction of the bitstream, non-video coding layer (VCL) network abstraction layer (NAL) units that are in the set of tracks and are redundant are removed.

10. The method of claim 5, wherein the format rule specifies that, in a process of reconstruction of a bitstream from the multiple tracks, redundant end of bitstream (EOB) or end of stream (EOS) network abstraction layer (NAL) units are removed.

11. The method of claim 5, wherein the format rule specifies that, in a process of reconstruction of the bitstream from the multiple tracks, access delimiter units (AUD) are removed or rewritten.

12. The method of claim 5, wherein the format rule specifies the property that a container of an entity group box associated with the entity group is disallowed from being stored in the visual media file at any level except for a pre-specified file-level box.

13. The method of claim 5, wherein the pre-specified file-level box is a group list box that is included in a file-level metadata box.

14. The method of claim 5, wherein the format rule specifies that, responsive to the bitstream being stored in a single track in the visual media file, either the entity group and/or the sample group are disallowed from being stored for the bitstream.

15. An apparatus comprising a processor configured to implement a visual media processing method, comprising:
performing a conversion between a visual media data and a visual media file that stores a bitstream of the visual media data according to a format rule;
wherein the visual media file stores multiple tracks that belong to an entity group of a specific type, and
wherein the format rule specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type.

16. The apparatus of claim 15, wherein the multiple tracks represent the bitstream.

17. The apparatus of claim 15, wherein the entity group of the specific type indicates that the multiple tracks exactly correspond to an operation point.

18. The apparatus of claim 15, wherein the sample group of the specific type includes information about which tracks of the multiple tracks correspond to the operation point.

19. A computer-readable storage medium having code stored thereon; the code, upon execution by a processor, causing the processor to implement a visual media processing method, comprising:
performing a conversion between a visual media data and a visual media file that stores a bitstream of the visual media data according to a format rule;
wherein the visual media file stores multiple tracks that belong to an entity group of a specific type, and
wherein the format rule specifies that, responsive to the multiple tracks having a track reference to a particular type to a group identifier, the multiple tracks (A) omit carrying a sample group of a specific type or (B) carry the sample group of the specific type such that information in the sample group of the specific type is consistent with that in the entity group of the specific type.

20. The computer-readable storage medium of claim 19, wherein the multiple tracks represent the bitstream,
wherein the entity group of the specific type indicates that the multiple tracks exactly correspond to an operation point, and
wherein the sample group of the specific type includes information about which tracks of the multiple tracks correspond to the operation point.

* * * * *